(12) United States Patent
Yakopcic et al.

(10) Patent No.: US 12,511,522 B2
(45) Date of Patent: Dec. 30, 2025

(54) SATISFIABILITY PROBLEM SOLVER IMPLEMENTED ON SPIKING NEURAL NETWORK EMBEDDED SYSTEMS

(71) Applicant: University of Dayton, Dayton, OH (US)

(72) Inventors: Chris Yakopcic, Dayton, OH (US); Tarek M. Taha, Centerville, OH (US)

(73) Assignee: UNIVERSITY OF DAYTON, Dayton, OH (US)

( * ) Notice: Subject to any disclaimer, the term of this patent is extended or adjusted under 35 U.S.C. 154(b) by 1259 days.

(21) Appl. No.: 16/933,994

(22) Filed: Jul. 20, 2020

(65) Prior Publication Data

US 2021/0019597 A1    Jan. 21, 2021

Related U.S. Application Data

(60) Provisional application No. 62/875,574, filed on Jul. 18, 2019.

(51) Int. Cl.
    G06N 3/049    (2023.01)
(52) U.S. Cl.
    CPC .................. G06N 3/049 (2013.01)
(58) Field of Classification Search
    CPC ............ G06N 5/01; G06N 3/042; G06N 7/01; G06N 3/02; G06N 3/047; G06N 20/00
    See application file for complete search history.

(56) References Cited

U.S. PATENT DOCUMENTS

| 5,636,328 | A  | 6/1997 | Kautz et al. |
| 7,536,373 | B2 | 5/2009 | Kelkar et al. |
| 8,165,980 | B2 | 4/2012 | Chen et al. |
| 8,165,981 | B2 | 4/2012 | Colena et al. |
| 8,468,041 | B1 | 6/2013 | Vengerov |

OTHER PUBLICATIONS

Ishdorj et al., Deterministic Solutions To QSAT and Q3SAT by Spiking Neural P Systems With Pre-Computed Resources, 2010, Theoretical Computer Science 411 (2010) 2345-2358 (Year: 2010).*

(Continued)

*Primary Examiner* — Luis A Sitiriche
(74) *Attorney, Agent, or Firm* — Taft Stettinius & Hollister LLP

(57) ABSTRACT

A spiking neural network (SNN) system is disclosed having spiking neurons associated with clause values associated with a satisfiability (SAT) problem. Each spiking neuron generates a voltage spike when on input voltage applied to each spiking neuron is increased above a spiking voltage threshold. The input voltage that is increased above the spiking voltage threshold is indicative that the corresponding clause value is satisfied. A controller applies the clause grid that includes clause values to a literal grid that includes literal values. The controller generates the input voltage that is applied to each spiking neuron based on each corresponding clause value associated with each spiking neuron that is applied to the literal values. The controller determines that each clause value is satisfied when the corresponding spiking neuron generates the voltage spike and that each clause value is unsatisfied when the corresponding spiking neuron fails to generate the voltage spike.

18 Claims, 8 Drawing Sheets

(56) References Cited

OTHER PUBLICATIONS

Maass, Wolfgang, Noise as a Resource for Computation and Learning in Networks of Spiking Neurons, 2014, Proceedings of the IEEE, vol. 102, No. 5, May 2014 (Year: 2014).*
Tetzlaff et al., Decorrelation of Neural-Network Activity by Inhibitory Feedback, 2012 (Year: 2012).*
"Using Stochastic Spiking Neural Networks on SpinNaker to Solve Constraint Satisfaction Problems" Gabriel A. Fonseca Guerra* and Steve B. Furber Advanced Processor Technologies Group, School of Computer Science, University of Manchester, Manchester, United Kingdom (Year: 2017).*
Rutishauser et al., "Solving constraint-satisfaction problems with distributed neocortical-like neuronal networks," Neural Comput. vol. 30, No. 5, pp. 1359-1393, May 2018.
Corder et al., "Solving Vertex Cover via Ising Model on a Neuromorphic Processor," IEEE International Symposium on Circuits and Systems (ISCAS), pp. 1-5, Florence, Italy, May 2018.
Hamilton et al., "Neural Networks and Graph Algorithms with Next-Generation Processors," IEEE International Parallel and Distributed Processing Symposium Workshops, pp. 1194-1203, Vancouver, BC, Canada, May 2018.
Fonseca Guerra et al., "Using Stochastic Spiking Neural Networks on SpinNaker to Solve Constraint Satisfaction Problems," Frontiers in Neuroscience, vol. 11, No. 714, pp. 1-13, Dec. 2017.
Jonke et al., "Solving Constraint Satisfaction Problems with Networks of Spiking Neurons," Frontiers in Neuroscience, vol. 10, No. 118, pp. 1-16, Mar. 2016.

* cited by examiner

SATISFIABILITY PROBLEM SOLVER IMPLEMENTED ON SPIKING NEURAL NETWORK EMBEDDED SYSTEMS

RELATED APPLICATIONS

The present application is a U.S. Nonprovisional Application which claims the benefit of U.S. Provisional Application No. 62/875,574 filed on Jul. 18, 2019, the disclosure of which is incorporated by reference in its entirety.

GOVERNMENT LICENSE RIGHTS

This invention was made with government support under Contract No. FA 8650-18-C-2808 awarded by the Human Effectiveness Director of Wright Patterson Air Force Base which is a branch of the U.S. Department of Defense.

FIELD OF THE INVENTION

This invention relates to neural networks, and more particularly, to systems and methods for implementing spiking neurons to solve satisfiability (SAT) problems in a spiking neural network embedded system.

BACKGROUND

Traditional computing systems use conventional microprocessor technology in that operations are performed in chronological order such that each operation is completed before the subsequent operation is initiated. The operations are not performed simultaneously. For example, an addition operation is completed before the subsequent multiplication operation is initiated. The chronological order of operation execution limits the performance of conventional microprocessor technology. Conventional microprocessor design is limited in how small the microprocessors can be designed, the amount of power that microprocessors consume, as well as the speed in which the microprocessors execute operations in chronological order. Thus, conventional microprocessor technology is proving insufficient in applications that require high computation power, such as SAT solving applications.

It is becoming common wisdom to use conventional neuromorphic computing networks which are laid out in a similar fashion as the human brain. Hubs of computing power are designed to function as a neuron in the human brain where different neurons of computing power are coupled to other neurons of computing power. This coupling of neurons enables the neuromorphic computing to execute multiple operations simultaneously. Therefore, the neuromorphic computing network has exponentially more computing power than traditional computing systems.

Conventional neuromorphic computing networks are implemented in large scale computer clusters which include computers that are physically large in order to attain the computation power necessary to execute applications such as SAT solving applications. For example, applications of these large scale computer clusters includes rows and rows of physically large servers that may attain the computation power necessary to execute SAT solving applications when coupled together to form a conventional neuromorphic computing network. Such large scale computer clusters not only take up a significant amount of physical space but also require significant amounts of power to operate.

The significant amount of physical space and power required to operate conventional neuromorphic computing networks severely limits the type of applications for which conventional neuromorphic computing networks may be implemented. For example, industries such as biomedical, military, robotics, and mobile devices are industries that cannot implement conventional neuromorphic computing networks due to the significant space limitations in such industries as well as the power limitations. Therefore, an effective means to decrease the space and the power required by conventional neuromorphic computing is needed.

SUMMARY OF THE INVENTION

The present invention provides a spiking neural network (SNN) system that implements a plurality of spiking neurons and a controller to solve a satisfiability (SAT) problem. A plurality of spiking neurons includes each spiking neuron associated with a corresponding clause value from a plurality of clause values associated with the SAT problem. Each spiking neuron is configured to generate a voltage spike when at least one input voltage applied to each spiking neuron is increased above a spiking voltage threshold. The at least one input voltage applied to each spiking neuron that is increased above the spiking voltage threshold is indicative that the corresponding clause value associated with the spiking neuron is satisfied. A controller is configured to determine a literal grid that includes a plurality of literal values associated with the SAT problem. Each literal value is a fixed binary value. The controller is configured to determine a clause grid that includes the plurality of clause values associated with the SAT problem. Each clause value includes a corresponding subset of the literal values and corresponds to a constraint from a plurality of constraints associated with the SAT problem and each constraint is to be satisfied to solve the SAT problem. The controller is configured to apply the clause grid that includes the plurality of clause values to the literal grid that includes the plurality of literal values. The controller is configured to generate the at least one input voltage that is applied to each spiking neuron based on each corresponding clause value associated with each spiking neuron that is applied to the plurality of literal values. The controller is configured to determine that each clause value is satisfied when the corresponding spiking neuron generates the voltage spike and that each clause value is unsatisfied when the corresponding spiking neuron fails to generate the voltage spike.

The present invention also provides a method for implementing a plurality of spiking neurons to solve a satisfiability (SAT) problem with each spiking neuron associated with a corresponding clause value from a plurality of clause values associated with the SAT problem. The method starts with generating by each spiking neuron included in a plurality of spiking neurons a voltage spike when at least one input voltage applied to each spiking neuron is increased above a spiking voltage threshold. The at least one input voltage applied to each spiking neuron that is increased above the spiking voltage threshold is indicative that the corresponding clause value associated with the spiking neuron is satisfied. The method further includes determining by a controller a literal grid that includes a plurality of literal values associated with the SAT problem. Each literal value is a fixed binary value. The method further includes determining a clause grid that includes the plurality of clause values associated with the SAT problem. Each clause value includes a corresponding subset of the literal values and corresponds to a constraint from a plurality of constraints associated with the SAT problem and each constraint is to be satisfied to solve the SAT problem. The method further includes applying the clause grid that includes the plurality of clause values to the literal grid that includes the plurality of literal values. The method further includes generating the at least one input voltage that is applied to each spiking neuron based on each corresponding clause value associated with each spiking neuron that is applied to the plurality of literal values. The method further includes determining that each clause value is satisfied when the corresponding spiking neuron generates the voltage spike and that each clause value is unsatisfied when the corresponding spiking neuron fails to generate the voltage spike.

The present invention also provides a spiking neural network (SNN) system that implements a plurality of spiking neurons and a controller to solve a satisfiability (SAT) problem. A plurality of spiking neurons includes each spiking neuron associated with a potential executed outcome of the SAT problem. The plurality of spiking neurons is configured to generate a voltage spike when a plurality of input voltages applied to each spiking neuron is increased above a spiking voltage threshold. The input voltages applied to each spiking neuron that is increased above the spiking voltage threshold is indicative that each parameter associated with the corresponding input voltage is satisfied. A controller is configured to apply each input voltage representing a corresponding parameter to each corresponding spiking neuron. The controller is configured to determine each corresponding spiking neuron that generates the voltage spike indicating that each corresponding parameter associated with the spiking neuron that generates the voltage spike is satisfied and each corresponding spiking neuron that fails to generate the voltage spike indicating that at least one parameter associated with the spiking neuron is unsatisfied. The controller is configured to apply a plurality of constraints to each spiking neuron that generates the voltage spike to determine each set of parameters associated with each spiking neuron that generates the voltage spike that satisfies each constraint. The controller is configured to select an optimized potential executed outcome to execute that is associated with an optimized spiking neuron. The optimized spiking neuron is the spiking neuron that generates the voltage spike and satisfies each constraint.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention. Additionally, the left most digit(s) of a reference number identifies the drawing in which the reference number first appears.

Embodiments are described with reference to the accompanying drawings. In the drawings, like reference numbers may indicate identical or functionally similar elements.

DETAILED DESCRIPTION

Figure 1:
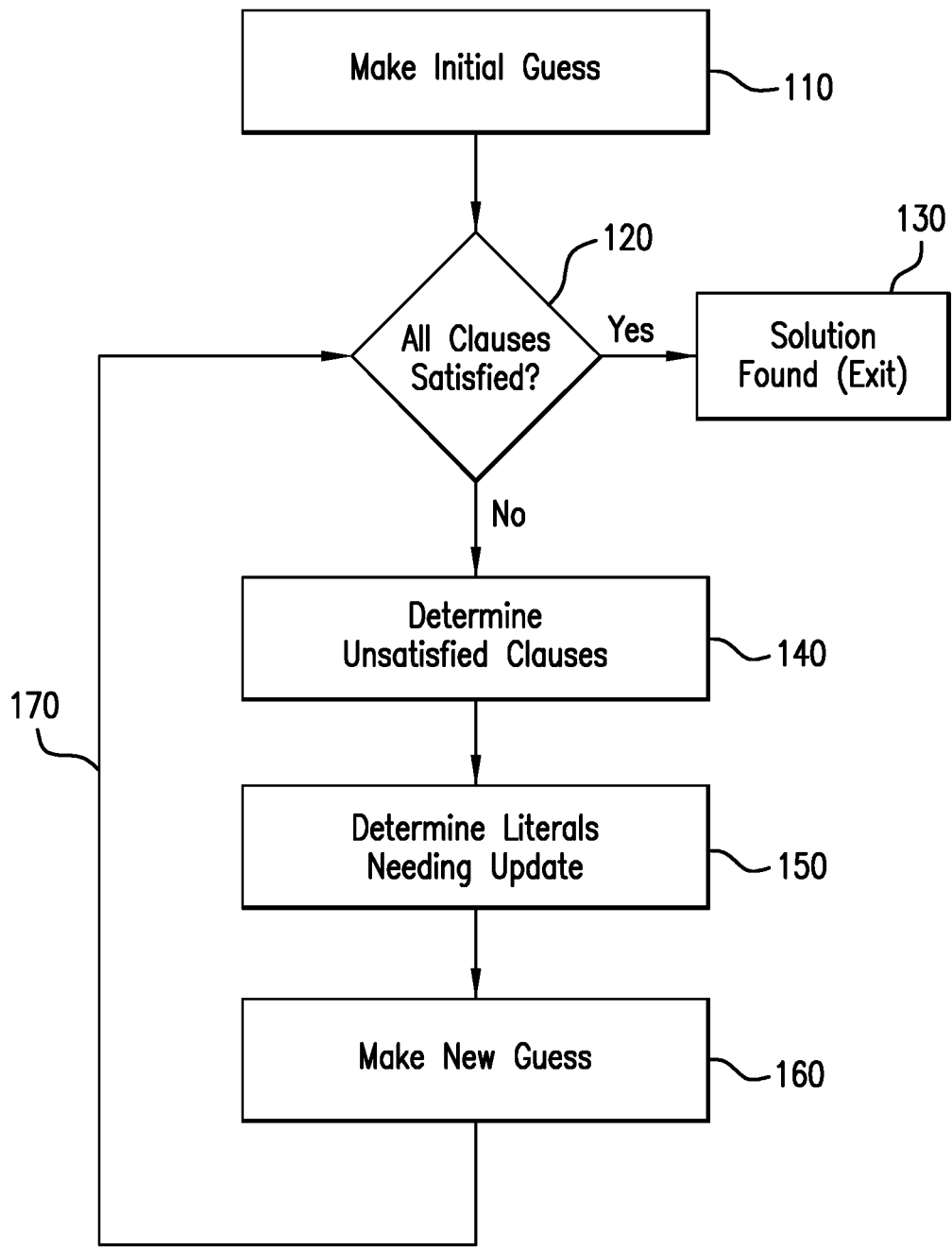
FIG. 1 is a flowchart of exemplary operational steps of a spiking neural network (SNN) system that implements spiking neurons to solve a satisfiability (SAT) problem in accordance with an embodiment of the disclosure.

The following Detailed Description refers to accompanying drawings to illustrate exemplary embodiments consistent with the present disclosure. References in the Detailed Description to "one embodiment," "an embodiment," "an exemplary embodiment," etc., indicate that the exemplary embodiment described can include a particular feature, structure, or characteristic, but every exemplary embodiment does not necessarily include the particular feature, structure, or characteristic. Moreover, such phrases are not necessarily referring to the same embodiment. Further, when a particular feature, structure, or characteristic is described in connection with an embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other embodiments are possible, and modifications can be made to exemplary embodiments within the scope of the present disclosure. Therefore, the Detailed Description is not meant to limit the present disclosure. Rather, the scope of the present disclosure is defined only in accordance with the following claims and their equivalents.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not limitation, such that the terminology or phraseology of the present specification is to be interpreted by those skilled in relevant art(s) in light of the teachings herein.

The present invention creates a spiking neural network implementing spiking neural hardware in which spiking neurons fire a spike and transmit data when the spiking neurons fire a spike. Conventional neural networks constructed of neurons continuously have an output and in continuously having an output each of the numerous neurons included in the conventional neural networks are also continuously calculating and transmitting data between neurons. Such continuous outputs resulting in continuous calculating and continuous transmitting of data between neurons of conventional neural networks results in a significant increase in power consumption. Rather, spiking neurons are limited to generating an output and communicating such data associated with the output when an input voltage associated with the spiking neuron increases beyond a spiking voltage threshold thereby trigging the spiking neurons to generate a voltage spike and generating an output and communicating such an output. As a result, spiking neural networks require significantly less power to operate as conventional neural networks as well as conventional computing systems. For example, spiking neural networks may consume 100 mW of power or less.

The spiking neurons may be incorporated to solve SAT problems in that inputs may be provided to the spiking neurons that correspond to constraints associated with the SAT problems. Constraints associated with the SAT problems are limitations associated with solving the SAT problem in that the SAT problem is required to be solved by satisfying each of the constraints. Should an attempted solution to the SAT problem fail to satisfy each of the constraints, then such an attempted solution fails to solve the SAT problem. Each of the constraints of the SAT problem may be converted into input voltages that are provided to each of the spiking neurons. Each of the spiking neurons spike when each of the input voltages increase above the spiking voltage threshold indicating that the constraints of the SAT problem associated with the spiking neurons have been satisfied thereby enabling the spiking neurons to spike and communicate to the other spiking neurons that such constraints have been satisfied. The spiking neurons refrain from spiking when the input voltages fail to increase above the spiking threshold indicating that the constraints of the SAT problem associated with the spiking neurons have failed to be satisfied. The ability for the spiking neurons to spike and refrain from spiking enables neurological computing to be performed by consuming 100 mW of power or less thereby enabling such neurological computing to be incorporated into mobile devices.

Figure 2:
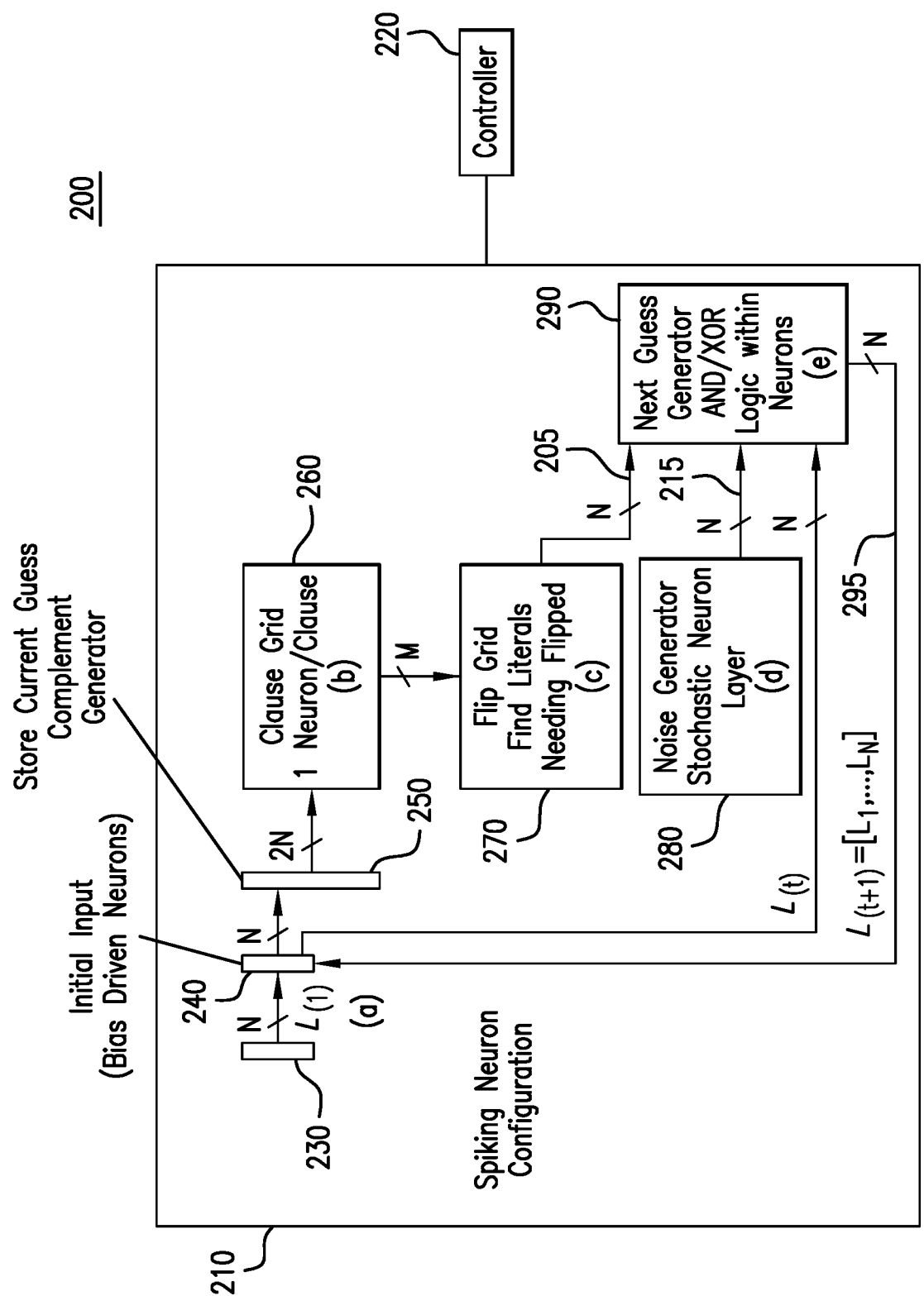
FIG. 2 is a schematic illustration of an exemplary SNN system that implements spiking neurons to solve a SAT problem in accordance with an embodiment of the disclosure.

Referring to FIG. 1, FIG. 1 is a flowchart of exemplary operational steps of a spiking neural network (SNN) system that implements spiking neurons to solve a satisfiability (SAT) problem similar to a SNN system 200 as shown in FIG. 2 according to an exemplary embodiment of the present invention. For discussion purposes, the following exemplary operation steps are focused on the execution of a SAT problem that may continue to iterate until a single valid solution to the SAT problem is determined by the SNN system 200. In doing so, an incomplete SAT solving approach is implemented by incorporating vector operations with the spiking neurons thereby enabling signals to be propagated through layers of spiking neurons such that problem specific information may be stored in weights applied between the different neuron layers. However, the present invention is not limited to this operational description. Rather, it will be apparent to persons skilled in the relevant art(s) from the teaching herein that other operational control flows are within the scope of the present invention. For example, other operational control flows that incorporate different spiking neural network configurations to interface with different spiking neural network hardware as well as implementing other neural network configurations that may incorporate vector matrix approaches that differ from spiking neural networks. The following discussion describes the steps in FIG. 1 by incorporating the SNN system 200 in FIG. 2 to execute the steps described in FIG. 1.

Referring to FIG. 2, the SNN system 200 may continue to execute iterations in which the spiking neurons may spike to determine when different clauses included in the SAT problem have been satisfied and based on this determination the SNN system 200 may continue to execute such iterations until each clause is satisfied thereby resulting in a final solution to the SAT problem. The SNN system 200 includes a controller 220 and a spiking neuron configuration 210. The spiking neuron configuration 210 includes initial input voltages applied to bias driven spiking neurons 230, current guess storage 240, a complement generator 250, a clause grid 260, a flip grid 270, a noise generator 280, and a next guess generator 290.

The controller 220 may be a device that is capable of electronically communicating with other devices. Examples of the controller 220 may include a mobile telephone, a smartphone, a workstation, a portable computing device, other computing devices such as a laptop, or a desktop computer, cluster of computers, set-top box, radio transmitters, and/or any other suitable electronic device that will be apparent to those skilled in the art relevant art(s) without departing from the spirit and scope of the disclosure.

In an embodiment, multiple modules may be implemented on the same computing device. Such a computing device may include software, firmware, hardware, or a combination thereof. Software may include one or more applications on an operating system. Hardware can include, but is not limited to, a processor, a memory, and/or graphical user interface display.

In an embodiment, the controller 220 may execute a program that may operate a neural network (that may include spiking neurons and/or non-spiking neurons) such that the controller 220 may be any type of computing device and/or neural chip that executes the program as discussed above. The controller 220 may be programmed in multiple software versions such as but not limited to MATLAB, PYTHON, code to be executed on the SNN hardware system and/or any other software platform that may execute the functionality of the controller 220 that will be apparent to those skilled in the art relevant art(s) without departing from the spirit and scope of the disclosure.

At step 110, an initial guess is implemented into the SNN system 200. As shown in FIG. 2, the spiking neuron configuration 210 includes a plurality of spiking neurons with each spiking neuron associated with a corresponding clause value from a plurality of clause values associated with the SAT problem. Specifically, in FIG. 2, initial input voltages applied to bias driven neurons 230 include input voltages initially applied to the bias driven neurons 230 as an initial guess implemented into the SNN system 200. As noted above, an incomplete SAT solving method may be incorporated into the SNN system 200 and executed via vector matrix operations. Such an incomplete SAT solving method includes a problem that is associated with various constraints that are required to be satisfied to solve the problem. In order to initiate the vector matrix operations of the SNN system 200, an initial guess is implemented into the SNN system 200 by the random selection of values to initially be applied as input voltages to the bias driven neurons 230.

For example, the controller 220 may determine a literal grid 240 that includes a plurality of literal values associated with the SAT problem. Each literal is a fixed binary value. The SAT problem may include a quantity of variables in which the controller 220 identifies each of the variables as a corresponding literal with a fixed binary value. In such an example, the SAT problem may include nine different variables in X1 . . . X9 in that each of the different variables may be affirmative in the SAT problem and thereby identified as a literal with a fixed binary value of "1" by the controller 220 or may be negative in the SAT problem and thereby identified as a literal with a fixed binary value of "0" by the controller 220. In order to initiate the iterative process in solving the SAT problem via the SNN system 200, the controller 220 may initially determine each initial binary value of each literal as "0" or "1" via random selection and the bias driven neurons 230 may then store the initial input of the binary values of each literal in a matrix configuration. As shown in FIG. 2, the quantity of literals with corresponding literal values as randomly determined by the controller 220 and applied to the bias driven neurons 230 as inputs may be the quantity of "N" as shown in FIG. 2 where "N" equals the quantity of literals identified for the SAT problem to be solved. The quantity of literals of "N" may be any quantity of literals that correspond to the quantity of variables required by the SAT problem that will be apparent to those skilled in the relevant art(s) without departing from the scope of the present disclosure.

The controller 220 may also instruct the complement generator 250 to generate a corresponding complement for each of the randomly determined initial values for each of the identified literals. In doing so, the quantity of literals may be doubled in that the complement generator 250 may generate the complement for each of the randomly determined initial values for each of the identified literals. For example, the SAT problem may include nine different literals in X1 . . . X9 thereby triggering the controller 220 to randomly determine an initial binary value of each literal of "0" or "1" resulting in nine different literal values. The complement generator 250 may then generate a complement for each of the literals in X1 . . . X9 resulting in an additional nine literal values resulting in eighteen total literal values as input voltages applied to the bias driven neurons as inputs that may be the quantity of "2N" as shown in FIG. 2 where "2N" equals the quantity of literals identified for the SAT problem to be solved and the corresponding complements. Further, each row of the vector matrix that corresponds to the input voltages applied to the bias driven neurons 230 may include each corresponding binary value associated with each literal and each complement of each literal. For example, the SAT problem that includes nine different literals in X1 . . . X9 may result in a vector matrix that includes eighteen rows triggered from each of the nine different literals and the corresponding nine complements.

At step 120, the operational control flow determines whether each clause associated with the SAT problem is satisfied. As noted above, the SAT problem includes numerous different constraints which are required to be satisfied in order for a solution to the SAT problem to be identified. The SAT problem may be broken down into clauses where each clause may represent a corresponding constraint that is required to be satisfied in order for a solution to the SAT problem to be satisfied. Each of the clauses are then required to be satisfied to determine a solution to the SAT problem. As a result, each clause is a subset of a combination of variables included in the SAT problem. For example, the SAT problem where there are nine literals in X1 . . . X9 that correspond to nine variables included in the SAT problem an example clause would be the subset of X2 or not X3. In such an example, the clause would be satisfied when X3 is "1" or X2 is "1" or X3 is "0". However, each of the numerous clauses that correspond to numerous parameters of the SAT problem that each are required to be satisfied to solve the SAT problem may overlap with numerous different variables resulting in complex iterations of the SNN system 200 to ultimately determine the solution to the SAT problem that satisfies each of the constraints of the SAT problem represented by the corresponding clauses.

Controller 220 may determine a clause grid 260 that includes a plurality of clause values associated with the SAT problem. Each clause value includes a corresponding subset of the literal values and corresponds to a constraint from a plurality of constraints associated with the SAT problem and each constraint is to be satisfied to solve the SAT problem. The controller 220 may incorporate each of the clause values that correspond to a clause associated with a corresponding constraint of the SAT problem into each column of the clause grid 260. Further, each clause value may be weighted with a binary weight to further provide the necessary impact of each clause as corresponding to each constraint of the SAT problem into the iterative determination of the solution to the SAT problem. In doing so, each constraint that includes a greater impact on the SAT problem may thereby be represented by a corresponding clause with clause values that have an increased binary weight to account for the increased impact of the clause relative to other clauses. The incorporation of the clause values into the clause grid 260 enables vector matrix operations to be incorporated in that the clause grid 260 as laid into a matrix format with each clause represented by clauses values incorporated into each column of the clause grid 260 may be easily applied to the vector matrix of the literal grid 240 which includes each literal value and each corresponding complement of each literal value for each literal representing each variable of the SAT problem.

The controller 220 may then apply the clause grid 260 that includes the plurality of clause values to the literal grid 240 that includes the plurality of literal values. In doing so, the vector matrix of the clause grid 260 with each clause value is applied to the vector matrix of the literal grid 240 with each literal value to determine each clause value that is satisfied when applied to the corresponding literal values and each clause value that is unsatisfied when applied to the corresponding literal values. The controller may then generate the at least one input voltage that is applied to each spiking neuron based on each corresponding clause value associated with each spiking neuron that is applied to the plurality of literal values. The at least one input voltage applied to each spiking neuron that is increased above the spiking voltage threshold is indicative that the corresponding clause value associated with the spiking neuron is satisfied.

In an embodiment, a single spiked neuron corresponds to a single clause such that a single spiked neuron corresponds to a corresponding each column of the clause grid 260 in that each column of the clause grid 260 represents a corresponding clause. Then each of the numerous single spiked neurons may correspond to each of the numerous clauses as represented by each corresponding column of the clause grid 260. In doing so, the controller 220 may generate input voltages and apply each input voltage to each single spiked neuron that corresponds to a clause in the clause grid 260 that is satisfied when the clause in the clause grid 260 is applied to the corresponding literals in the literal grid 240. As a result, each single spiked neuron that corresponds to a clause in the clause grid 260 that is satisfied by the corresponding literals may generate a voltage spike indicating that that the corresponding clause in the clause grid 260 has been satisfied. The input voltages applied by the controller 220 when the corresponding clause in the clause grid 260 has been satisfied is increased above the spiking voltage threshold for each corresponding spiked neuron triggering each corresponding spiked neuron to generate the voltage spike indicating that the corresponding clauses associated with the spiked neurons that have generated voltages spikes have been satisfied.

The controller 220 may determine that each clause value is satisfied when the corresponding spiking neuron generates the voltage spike and that each clause value is unsatisfied when the corresponding spiking neuron fails to generate the voltage spike. The positioning of each clause in a corresponding column of the clause grid 260 as well as a single spiking neuron that corresponds to each clause thereby corresponding to a corresponding column of the clause grid 260, the controller 220 may apply a vector matrix multiply of each spiking neuron and the clause grid 260. In doing so, the controller 220 may determine each column of the clause grid 260 that is associated with the corresponding spiking neuron that has generated the voltage spike. The controller 220 may then determine that each clause associated with the corresponding column of the clause grid 260 that is associated with the corresponding spiking neuron that generated the voltage spike is satisfied. The controller 220 may also determine each column of the clause grid 260 that is associated with the corresponding spiking neuron that has failed to generate the voltage spike. The controller 220 may then determine that each clause associated with the corresponding column of the clause grid 260 that is associated with the corresponding spiking neuron that fails to generate the voltage spike is unsatisfied.

In an embodiment, at least one input voltage applied to each spiking neuron that is increased above the spiking voltage threshold is indicative that the corresponding clause value associated with the spiking neuron unsatisfied. Rather than the controller 220 determining each clause that has been satisfied based on the each corresponding spiking neuron that generates the voltage spike, the controller 220 may determine each clause that has been unsatisfied based on each corresponding spiking neuron that generates the voltage spike. The SNN system 200 may implement either embodiment in which the clause that has been satisfied based on each spiking neuron that generates the voltage spike or the in which the clause has been unsatisfied based on each spiking neuron that generates the voltage spike. For ease of discussion, the embodiment in which the clause has been satisfied based on each spiking neuron that generates the voltage spike is to be incorporated throughout the remainder of the discussion.

The controller 220 may then determine whether each clause has been satisfied. The controller 220 may determine whether each clause has been satisfied based on whether each spiking neuron generated the voltage spike. The operation control flow may then move to step 130 when each of the spiking neurons generate the voltage spike thereby indicating that each of the clauses have been satisfied resulting in the final solution to the SAT problem being discovered. In step 130, the literal values of each of the literals that satisfy each of the clauses may then be incorporated as the solution to the SAT problem. The operation control flow may move to step 140 when at least one spiking neuron fails to generate the voltage spike thereby indicating that at least one clause remains unsatisfied resulting in a failure to generate the final solution to the SAT problem.

At step 140, the operational control flow determines each of the unsatisfied clauses after the clause grid 260 is applied to the literal grid 240. As noted above, the controller 220 may determine each of the unsatisfied clauses based on the corresponding spiked neurons that fail to generate the voltage spike. In failing to generate the voltage spike, each clause corresponding to each spiked neuron that failed to generate the voltage spike also failed to generate the input voltage sufficient to increase above the spiking voltage threshold to generate the voltage spike thereby indicating to the controller 220 that the corresponding clause failed to be satisfied.

At step 150, the operational control flow determines literals that require updating. The controller 220 may determine a plurality of correct literal values and a plurality of incorrect literal values after the clause grid 260 is applied to the literal grid 240. Each correct literal value is included in a corresponding clause value that is satisfied and each incorrect literal value is included in a corresponding clause value that is unsatisfied. The clause grid 260 may output each clause as represented by the vector "M" that is satisfied based on each corresponding spiked neuron that generated the voltage spike when the clause grid 260 is applied to the literal grid 240. The controller 220 may then from each clause as represented by the vector "M" that is satisfied based on each corresponding spiked neuron that generated the voltage spike each clause that is not represented by the vector "M" and thereby correspond to spiked neurons that failed to generate the voltage spike resulting in each clause being unsatisfied.

The flip grid 270 may then determine from the spiked neurons that failed to generate the voltage spike each clause that remains unsatisfied. The flip grid 270 may also determine each literal that interacted with each unsatisfied clause. The controller 220 may then identify from the flip grid 270 each literal that interacted with each unsatisfied clause and may determine the original literal value of each literal that interacted with each unsatisfied clause. The controller 220 may transition each incorrect literal value to a corresponding complemented literal value. Each corresponding complemented literal value is a complement of the incorrect literal value that is initially applied to the corresponding clause value that is unsatisfied. For example, the controller 220 may determine that the literal of X1 interacted with an unsatisfied clause had original value of "1". The controller 220 may then determine the original value of the literal X1 of "1" and then may transition the literal value of X1 from "1" to the complement of "0" due to the literal of X1 interacting with an unsatisfied clause.

At step 160, the operational control flow determines a new guess to apply to the current guess storage 240. After each literal that is identified as being associated with a clause that is determined to be unsatisfied during the previous iteration and each literal value is then flipped to the complement value, the controller 220 may then generate an updated vector matrix that includes the complement value of each of the literal values that were previously associated with clauses that were determined to be unsatisfied. The controller 220 may then generate the updated vector matrix as the new guess to apply to current storage 240 for the next iteration to determine which clauses are satisfied and unsatisfied when the updated vector matrix with the updated literal values is applied to the clause grid 260 as discussed above.

At step 170, the operational control flow the provides a feedback loop 295 that enables the controller 220 to provide the updated vector matrix with the updated literal values such that the updated vector matrix with the updated literal values may be applied to the clause grid 260 for the next iteration to determine which clauses are satisfied and unsatisfied. The controller 220 may apply the clause grid 260 to the plurality of clause values to a revised literal grid 240 that that includes the corresponding complemented literal value of each incorrect literal previously generated when the clause grid 260 is applied to the literal grid 240. The controller 220 may generate the at least one input voltage that is applied to each spiking neuron based on each corresponding clause value associated with each spiking neuron that is applied to each revised literal value included in the revised literal grid 240. The controller 220 may determine that each clause value is satisfied when the corresponding spiked neuron generates the voltage spike and each clause value is unsatisfied when the corresponding spiking neuron fails to generate the voltage spike as discussed in detail above.

The controller 220 may then continue to repeat each iteration as discussed above until each clause is satisfied. Following each iteration, the quantity of literals that are associated with clauses that are unsatisfied may continue to incrementally decrease after a revised literal grid 240 is generated with each complement literal value for each literal value associated with clauses that are unsatisfied following each iteration. Eventually, each clause may be satisfied and the resulting literal grid 240 with the current literal values that are associated with each clause is satisfied, then such resulting literal grid 240 is the solution to the SAT problem.

In doing so, the controller 220 may continuously feedback 295 each value that is unsatisfied following each iteration of applying the clause grid 260 to an updated revised literal grid 240 that includes the corresponding literal value of each incorrect literal previously generated when the clause grid 260 is applied to the literal grid 240. The controller 240 may continuously apply the clause grid 260 to each updated revised literal grid 240 when at least one spiking neuron fails to generate the voltage spike indicating that at least one clause value is unsatisfied. The controller 220 may determine when each spiking neuron generates the voltage spike indicating each clause value is satisfied. The controller 220 may generate a SAT answer value that includes each current value of each corresponding literal value after each spiking neuron generates the voltage spike indicating each clause value is satisfied. The SAT answer value is an answer to the SAT problem.

In an embodiment, a noise generator 280 may randomly select a first portion of incorrect literal values from the plurality of incorrect literal values to transition to the corresponding complemented literal value and a second portion of incorrect literal values to refrain from transitioning to the corresponding literal value to prevent the SNN system 200 from locking up when transitioning each incorrect literal value to the corresponding complemented literal value. The quantity of literals associated with clauses that are unsatisfied may significant especially during the first several iterations. The flip grid 270 attempting to transition each of the numerous of literal values associated with clauses that are unsatisfied to the complemented literal value may be so significant that the flip grid 270 may lock up when attempting to transition such a numerous amount of literal values to the complemented literal value.

As a result, the noise generator 280 may include a layer of randomly spiking neurons where randomly selected spiking neurons may fire the voltage spikes and apply such randomly fired voltage spikes to the matrix grid of literal values that are associated with clauses that are unsatisfied and require to be transitioned to the complemented literal value. Spiking neurons included in the noise generator 280 that are not randomly selected to fire the voltage spikes refrain from doing so. The controller 220 may then instruct the flip grid 270 to only transition the literal values to the complemented literal values of literals associated with clauses that are unsatisfied to a first portion of literals that are also associated with the spiking neurons included in the noise generator 280 that are randomly selected to fire the voltage spikes. The controller 220 may then instruct the flip grid 207 to refrain from transitioning the literal values to the complemented literal values of literals associated with clauses that are unsatisfied to a second portion of literals that are associated with the spiking neurons included in the noise generator 280 that are not randomly selected to fire the voltage spikes.

In doing so, the quantity of literal values that are to be transitioned to the complemented literal value for literals associated with clauses that are unsatisfied are sufficiently decreased to prevent the flip grid 270 from locking up. However, the a sufficient quantity of literal values that are to be transitioned to the complemented literal value for the literals associated with clauses that are satisfied are still transitioned by the flip grid 270 to adequately continue to increase the amount of clauses that are satisfied in each iteration to ultimately advance to each clause being satisfied to generate the solution to the SAT problem. As noted above, the controller 220 may continue to execute the above steps in an iterative manner until each clause is satisfied thereby indicating that the literal values of the literals associated with each of the satisfied clauses represents the solution to the SAT problem. The controller 220 may then implement a stop signal after the final iteration in which each of the clauses are satisfied indicating that the literal values of the literals associated with each of the satisfied clauses represents the solution to the SAT problem. The controller 220 may request that a significant negative voltage spike be generated that destroys the feedback loop 295 to ensure that no further iterations are executed to taint the final literal values of the literals representing the solution to the SAT problem. In doing so, the final literal values of the literals representing the solution to the SAT problem may be collected by the controller 220.

Figure 3:
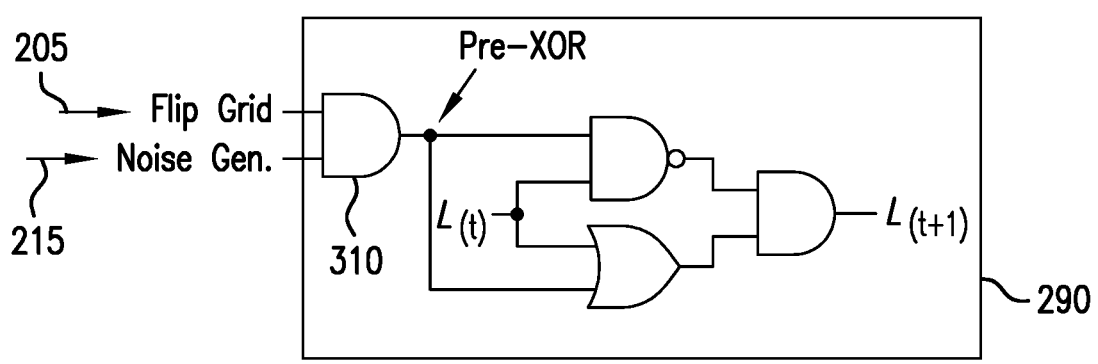
FIG. 3 is a schematic illustration of an exemplary configuration of the next guess generator that incorporates AND/XOR logic within spiking neurons in accordance with an embodiment of the disclosure.

Referring to FIG. 3, an example configuration 300 of the next guess generator 290 that incorporates AND/XOR logic within spiking neurons. The literals that are associated with clauses that are unsatisfied 205 may be provided as an input to the next guess generator 290 as well as the random spiking neurons that are generating the voltage spikes 215 as included in the noise generator 2800 may be applied as an input to the next guess generator 290. As shown in FIG. 3, the flip grid outputs 205 and the noise generator outputs 215 may be provides as inputs into an AND gate which is a pre-XOR and then an XOR logic is applied to generate the new guess that is the feedback 295 applied to the current guess storage 240.

Referring to FIG. 3, a SNN system 400 that determines each potential executed outcome that may satisfy as a potential executed outcome of a SAT problem and then identifies an optimized potential executed outcome from the potential executed outcomes in which the optimized potential executed outcome when executed as a potential executed outcome to the SAT problem may result in an increase in efficiency in solving the problem as compared to the other potential executed outcomes. The SNN system 400 includes a controller 410, a parameter determiner 420, a constraint handler 495, a spike generator and accumulation modulator 440, an isolated spiked neuron grid 430, a spiking output 450, and a resulting allocation 450. In an example, the parameter determine 420 may include a priority parameter 460a, a success parameter 460b, a time parameter 460n, a time to target parameter 465a, a time to completion parameter 465b, and a base accumulation rate 480. The constrain handler 420 includes a connectivity matrix 470a, a vehicle control constraint 470b, and a task control constraint 470n. The SNN system 400 shares many similar features with the SNN system 200; therefore, only the differences between the SNN system 200 and the SNN system 100 are to be discussed in further detail.

The controller 410 may be a device that is capable of electronically communicating with other devices. Examples of the controller 410 may include a mobile telephone, a smartphone, a workstation, a portable computing device, other computing devices such as a laptop, or a desktop computer, cluster of computers, set-top box, radio transmitters, and/or any other suitable electronic device that will be apparent to those skilled in the art relevant art(s) without departing from the spirit and scope of the disclosure.

In an embodiment, multiple modules may be implemented on the same computing device. Such a computing device may include software, firmware, hardware, or a combination thereof. Software may include one or more applications on an operating system. Hardware can include, but is not limited to, a processor, a memory, and/or graphical user interface display.

In an embodiment, the controller 410 may execute a program that may operate a neural network (that may include spiking neurons and/or non-spiking neurons) such that the controller 220 may be any type of computing device and/or neural chip that executes the program as discussed above. The controller 410 may be programmed in multiple software versions such as but not limited to MATLAB, PYTHON, code to be executed on the SNN hardware system and/or any other software platform that may execute the functionality of the controller 410 that will be apparent to those skilled in the art relevant art(s) without departing from the spirit and scope of the disclosure.

As discussed in detail above regarding the SNN system 100, the SNN system 200 may identify several different potential executed outcomes to the SAT problem in that several different potential executed outcomes to the SAT problem may satisfy each of the constraints associated with the SAT problem. However, the SNN system 200 may then rank each of the several different potential executed outcomes to the SAT problem and then determine which of the several different potential executed outcomes to the SAT problem that when executed may solve the SAT problem with an increased efficiency as compared to the other potential executed outcomes to the SAT problem. In doing so, the controller 410 may identify several different parameters associated with the SAT problem as well as apply weights to each of the parameters. The controller 410 may also identify the different constraints associated with the SAT problem that are required to be satisfied to solve the SAT problem. The controller 410 may then determine which of the potential executed outcomes to the SAT problem may result in an increased efficiency in solving the SAT problem based on the parameters that are satisfied and as well as ranked based on the weights assigned to each parameter as well as the constraints that are also satisfied.

A plurality of spiking neurons 430($a$-$n$), where n is an integer equal to or greater than one, includes each spiking neuron 430($a$-$n$) associated with a potential executed outcome to the SAT problem. The plurality of spiking neurons 430($a$-$n$) may generate a voltage spike when a plurality of input voltages applied to each spiking neuron is increased above a spiking voltage threshold. The input voltages applied to each spiking neuron that is increased above the spiking voltage threshold is indicative that each parameter associated with the corresponding input voltage is satisfied. A parameter may be a necessary feature associated with the solving the SAT that may have an impact on the efficiency of the potential executed outcome to the SAT problem. As noted above, a constraint is associated with the SAT problem and is required to be satisfied in order to solve the SAT problem. However a parameter is a necessary feature associated with the solving the SAT problem but depending on the parameter and the priority of the parameter in solving the SAT problem may have a varied impact on the potential executed outcome to the SAT problem.

For example, the SAT problem is destroying a target by an airplane. The SAT problem in destroying the target includes constraints that must satisfied such as having the plane having the appropriate munitions to destroy the target as well as being within a distance to strike the target. However, the SAT problem in destroying the target may also include parameters that are necessary features associated with the mission of destroying the target such as the priority of destroying the target compared to other targets, the success in the airplane destroying the target, as well as the time to arrive to the target and the time to destroy the target. Although several different airplanes may satisfy the constraints of having the necessary munitions to destroy the target and being within a distance to destroy the target, a specific airplane may have an increased efficiency as compared to the other airplanes that satisfy the constraints to destroy the target.

In such an example, the priority of the target may be of greater priority to the specific airplane as compared to the other airplanes, the specific airplane may have a greater success rate to destroy the target based on the type of target and the type of airplane, and the specific airplane may have a shorter time to target and time to destroy the target as compared to the other airplanes. Thus, the other airplanes may satisfy the constraints to be able to destroy the target but the specific airplane that has the parameters impact the specific airplane such that specific airplane may destroy the target with an increased efficiency as compared to the other airplanes that satisfy the constraints to destroy the target. As noted above, a constraint may be any kind of constraint that is required to solve a SAT problem that will be apparent to those skilled in the relevant art(s) without departing from the scope of the present disclosure. A parameter may be any time of necessary feature associated with SAT problem in that the parameter may have varying levels of impact on the different potential executed outcomes of the SAT problem thereby resulting in an increased efficiency of different potential executed outcomes as compared to the other potential executed outcomes that will be apparent to those skilled in the relevant art(s) without departing from the scope of the present disclosure.

The controller 410 may apply each input voltage representing a corresponding parameter to each corresponding spiking neuron. Each of the parameters associated with the SAT problem may be applied as input voltages to each of the corresponding spiking neurons included in the SNN system 200. For example, referring to FIG. 5, the isolated neuron grid configuration 500 depicts each of the spiking neurons 430($a$-$n$) included in the SNN system 200. Each of the spiking neurons 430($a$-$n$) are arranged in a grid configuration such that each row of the isolated neuron grid configuration 500 is associated with a corresponding vehicle 510 ($a$-$n$), where n is an integer equal to or greater than one and each column of the isolated neuron grid configuration 500 is associated with a corresponding target 520($a$-$n$), where n is an integer equal to or greater than one. In doing so, spiking neuron 430$a$ is associated with vehicle 510$a$ and target 520$a$ such that the parameters associated with the vehicle 510$a$ and the target 520$a$ are applied to the spiking neuron 430$a$ as input voltages. The spiking neuron 430$b$ is associated with vehicle 510$a$ and target 520$a$ such that the parameters associated with the vehicle 430$b$ and the target 520$b$ such that the parameters associated with the vehicle 510$a$ and the target 520$b$ are applied to the spiking neuron 430$b$ as input voltages and so on.

In such an example, the parameters 460($a$-$n$) of priority 460$a$, success 460$b$, and time 460$n$ are applied as input voltages to each of the spiking neurons 430($a$-$n$). Each parameter 460($a$-$n$) may have a different impact on the potential executed outcome of each different vehicle 510($a$-$n$) relative to each different target 520($a$-$n$) in destroying the target. The different impact may be accounted for based on the input voltage applied to each of the different spiking neurons 430($a$-$n$). For example, the parameter of priority 460$a$ may be assigned to each target 520($a$-$n$) in that the priority of each target is associated with how necessary each target 520($a$-$n$) is to be destroyed relative to each other target 520($a$-$n$). A target 520($a$-$n$) within an increased priority 460$a$ may result in an increased input voltage applied to the spiking neurons 430($a$-$n$) associated with the target 520($a$-$n$) with increased priority 460$a$ due the increased impact of the execution of destroying the targets 520($a$-$n$) with increased priority 460$a$. Thus, vehicles 510($a$-$c$) may each have an increased input voltage relative to priority 460$a$ as target 430$a$ has an increased priority 460$a$ to destroy as compared to targets 520($b$-$n$) thereby requiring an increased input voltage for priority 460$a$ for vehicles 510($a$-$c$). In doing so, the likelihood of destroying target 430$a$ is increased as compared to destroying targets 430($b$-$n$) that have decreased priority 460$a$.

A target 520($a$-$n$) that requires a specific munition to be positioned on the vehicle 510($a$-$n$) to destroy the target 520($a$-$n$) may result in an increased success 460$b$ due to the increased impact of the execution of destroying the target 520($a$-$n$) with the appropriate munition resulting in an increased success 460$b$. Thus, vehicles 510$e$, 510$d$, and 510$n$ may each have an increased input voltage relative to success 460$b$ as target 430$c$ requires a specific munition that is positioned on vehicles 510$e$, 510$d$, and 510$n$ thereby requiring an increased input voltage for success 460$b$ for vehicles 510$e$, 510$d$, and 510$n$. In doing so, the likelihood of destroying target 430$c$ is increased by vehicles 510$e$, 510$d$, and 510$n$ that have the specific munition required to destroy target 430$c$ as compared to the other vehicles that do not have the specific munition to destroy target 430$c$.

Each of the vehicles 510($a$-$n$) that are positioned within a decreased distance to a target 520($a$-$n$) as compared to other targets 520($a$-$n$) may result in an increased time 460$n$ due to the increased impact of destroying the target 520($a$-$n$) due to the vehicles 510($a$-$n$) positioned within a decreased distance to the target 520($a$-$n$) as compared to other targets 520($a$-$n$). Thus, vehicles 510$f$, 510$g$, and 510$h$ may each have an increased input voltage relative to time 460$n$ as target 430$b$ is within a decreased distance of vehicles 510$f$, 510$g$, and 510$h$ as compared to the other vehicles thereby requiring an increased input voltage for time 460$n$ for vehicles 510$f$, 510$g$, and 510$h$. In doing so, the likelihood of destroying target 430$b$ is increased by vehicles 510$f$, 510$g$, and 510$h$ that are within a decreased distance of target 430$b$ as compared to the other vehicles that are an increased distance from target 430$b$.

Problems at High Speed for Automated Systems

A particular problem that is often tasked to the CDO: M by N asset allocation. In this case, M tasks are present in an assignment description, and N vehicles are available to resolve each task. Each task has a priority (P), a travel time relative to each vehicle (TTA), a probability of success (S), and a time to task completion (TTC). In this problem TTC is equal to time to arrival (TTA) plus the time on task (TOT). It is the job of the CDO to determine the best possible way to allocate N vehicles to M tasks. The winning allocation decision is determined by the maximization of some objective function that produces some reward value based on a combination of these variables.

The constraint that a given vehicle can only be assigned to one task. However, multiple vehicles can be assigned to the same task. An assignment of multiple vehicles to a single task may be the case if a given task has a high enough priority to justify this action. One way to implement these decision making systems in hardware is to use GPUs to execute the instructions which generate the possible outcomes. The problem with this approach is that the asset allocation problem can have an extremely large number of possible outcomes, and checking all of them with a GPU takes an unrealistic amount of time when optimized assignments are needed quickly. The number of possible outcomes for this problem can be calculated as $(N+1)^M$.

The proposed spiking neuron approach does not always predict the absolute best possible solution (that could be determined using an exhaustive search algorithm). However, it provides a near-optimal solution in a time that can be more than 1000× faster than the exhaustive search approach (depending on problem size). This system is based on a simple integrate and fire neuron model, where a single neuron is dedicated to each vehicle-target combination. The accumulation of each neuron is driven by a weight matrix that holds information relating to a specific allocation scenario. In this system, each neuron in the neuron grid is only required to fire a maximum of one time before the allocation result is determined. This is because winning vehicle-task combinations are determined by which neurons (each representing a possible vehicle-task combination) are able to fire first.

Figure 4:
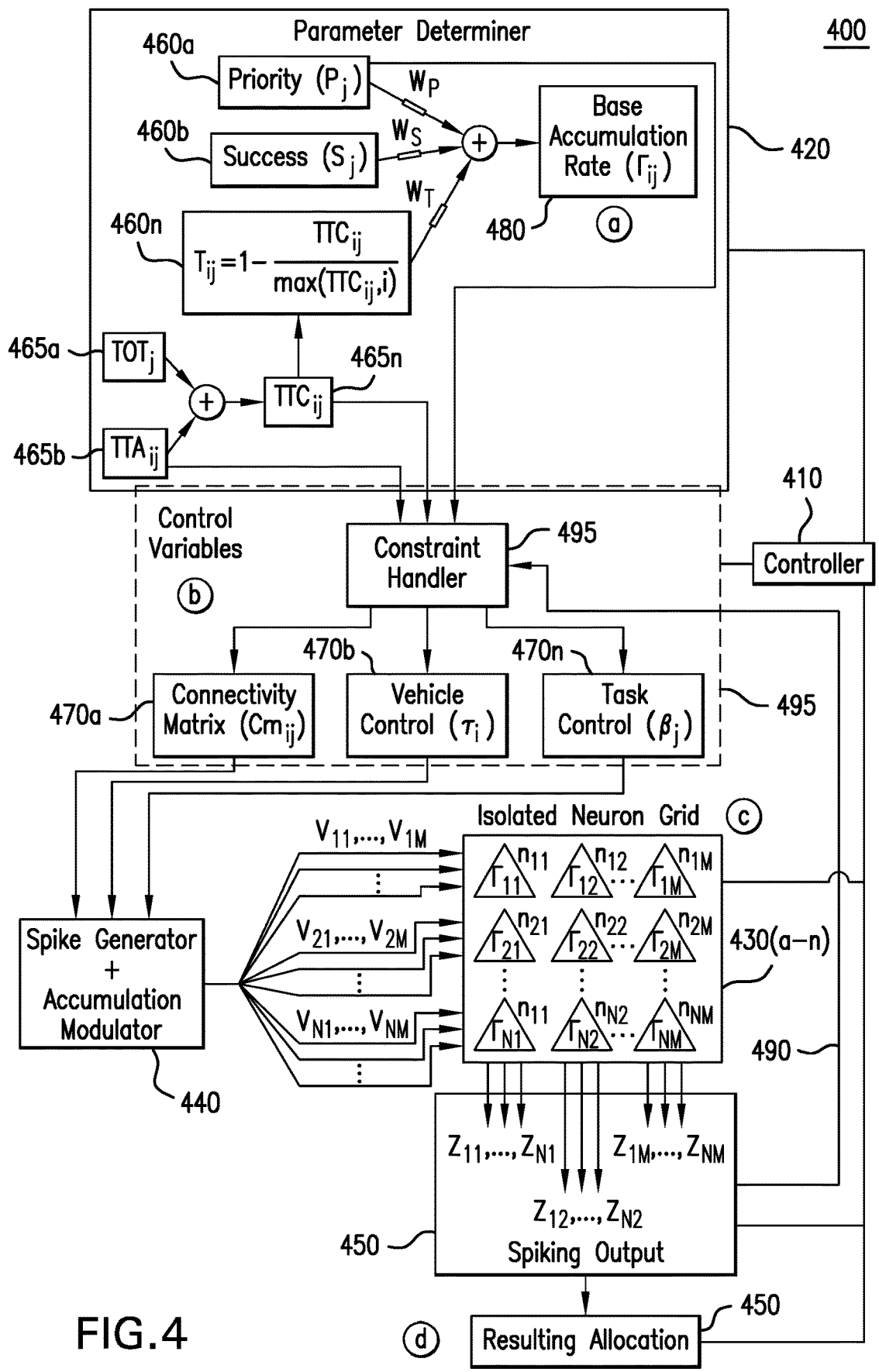
FIG. 4 is a block diagram for the spiking neuron based asset allocation system showing the relationship between (a) the base accumulation rate, (b) the neuron control variables, (c) the isolated neuron grid, and (d) the resulting allocation output.

FIG. 4 displays a block diagram for the proposed spiking neuron approach. When in operation, each neuron in the system is subject to a constant uniform spiking input. This is due to the first layer of neurons being driven by a constant bias. Each neuron possesses a weight value that when combined with an input spike, produces a base accumulation rate. Each neuron has a unique base accumulation rate that is determined by the set of parameters that correspond to a specific scenario.

During operation, active neurons will accumulate until the winning set of neurons fires, resulting in a winning vehicle-task allocation combination. Whether or not a particular neuron is active depends of some additional control variables that are implemented within this system.

Each neuron ($n_{ij}$) in the isolated neuron grid essentially accumulates according to equations (1) through (3). Each individual neuron has a unique base accumulation rate $\Gamma_{ij}$ as seen in equation (1). This rate is dependent on a weighted sum of task priority, task success, and relative task completion time. In equation (1), the weight values $w_P$, $w_S$, and $w_T$ correspond to priority ($P_j$), success ($S_j$) and completion time ($T_{ij}$) respectively. Each of the weights $w_P$, $w_S$, and $w_T$ are manually set to a value between 0 and 1. In this work, $w_P=0.45$, $w_S=0.1$, and $w_T=0.5$.

$$\Gamma_{ij}=w_P P_j + w_S S_j + w_T T_{ij} \quad (1)$$

As shown in equation (2) the value $T_{ij}$ is determined by inverting the magnitude of the values in the $TTC_{ij}$ matrix. Thus, the biggest reward is placed upon the vehicle-task combinations that have the shortest completion times. In the denominator in equation (2), the maximum function collapses the $TTC_{ij}$ matrix along the i dimension. This means that the denominator in equation (2) results in an array of size M that holds the largest vehicle-task distance relative to each task. Thus, $T_{ij}=0$ for all vehicle-task combinations with the longest TTC for a given task. The value $T_{ij}$ becomes larger as TTC is reduced.

$$T_{ij} = 1 - \frac{TTC_{ij}}{\max(TTC_{ij}, i)} \quad (2)$$

The base accumulation rate is then multiplied by a series of control variables to obtain the total accumulation rate $A_{ij}$ in equation (3).

$$A_{ij} = CM_{ij} \times \beta_j \times \tau_i \times \Gamma_{ij} \quad (3)$$

The parameter $CM_{ij}$ corresponds to the connectivity matrix. The connectivity matrix can be used to address constraints in more complex scenarios where only certain types of available vehicles are appropriate for specific types of tasks. Thus, $CM_{ij}$ could be set to 0 for any invalid vehicle-task combination to stop accumulation relating to incompatible pairs. Constraints could also be based on scenario parameters, which is why several parameters are shown as control inputs to the constraint handler.

The parameter $\beta_j$ is a dynamic variable can apply additional decay to certain neuron accumulation rates under certain circumstances. At the beginning of any cycle, $\beta_j$ is equal to $\frac{1}{2}^{D_j}$ for task j, where $D_j$ is equal to the number of vehicles already allocated to task j. This means that if a vehicle reaches task j, then all other vehicles will have a slowed accumulation in regards to task j. This increases the necessity of addressing a large number of tasks without eliminating the possibility that two vehicles can be allocated to the same task (because a high task priority may deem this necessary). At the beginning of a scenario, $D_j$ is 0 for all tasks.

The parameter $\tau_i$ is a binary variable that tracks which vehicles have been allocated to a task during the scenario runtime. If vehicle i was successfully allocated, then all other neurons that correspond to vehicle i should no longer accumulate. This is because a vehicle can only be allocated to one task within a scenario. Thus if $\tau_i=0$ for each vehicle i, then the allocation problem is complete.

The parameters $\tau_i$ and $\beta_j$ are implemented in the SNN hardware system using a layer of feedback neurons. However, in these parameters are implanted using logical operators that impact the spiking inputs. Therefore, in the general system block diagram in FIG. 4, the implementation of $\tau_i$ and $\beta_j$ is abstracted and handled by an accumulation modulator function that resides alongside the uniform spiking inputs. Details on the SNN hardware system implementation will be discussed in the next section.

Figure 5:
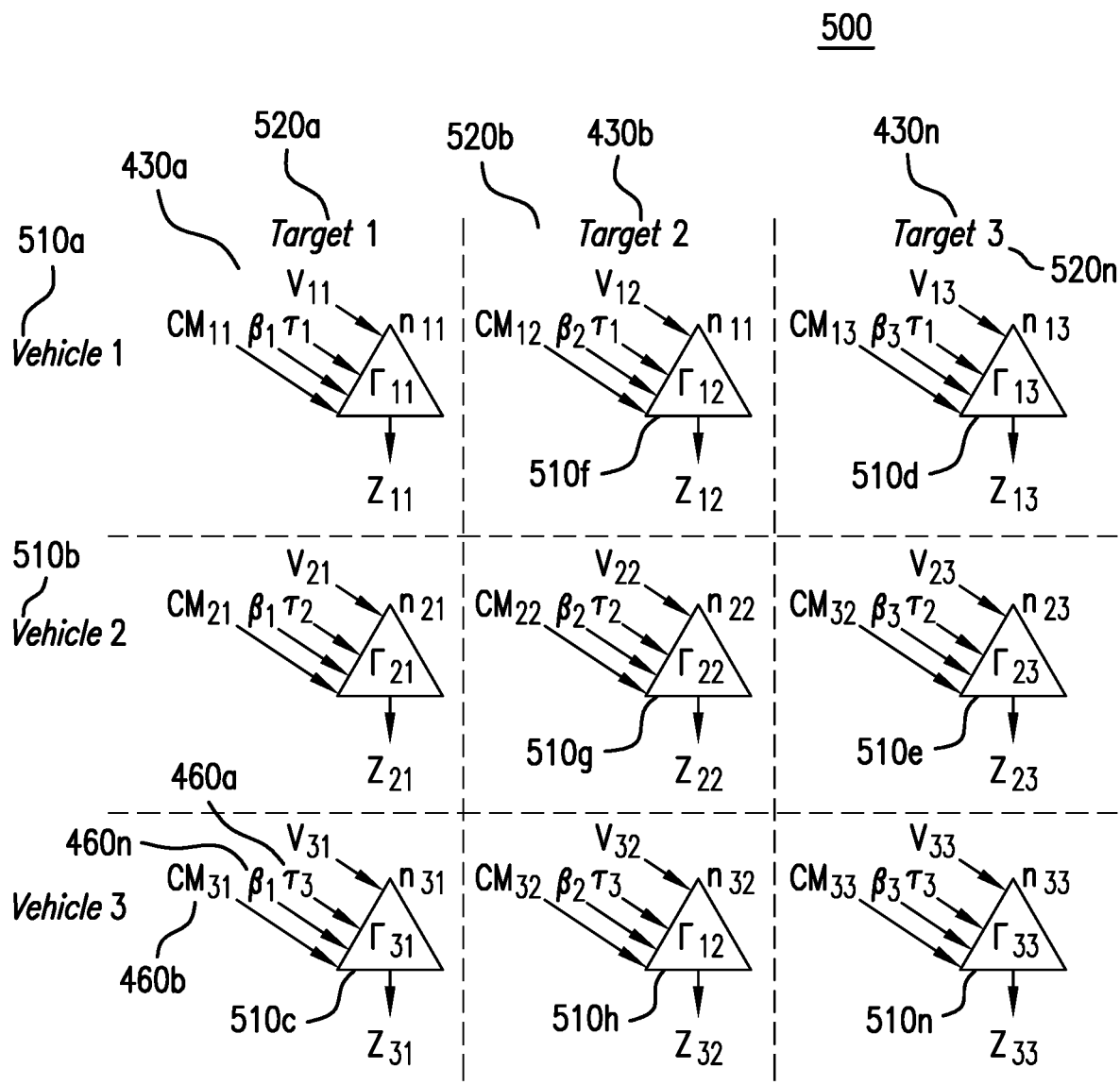
FIG. 5 is a connection diagram for the proposed isolated neuron matrix.

A visual representation for the isolated neuron grid corresponding to a 3×3 allocation problem is displayed in FIG. 5. One neuron is present for each vehicle-task combination. Therefore, a 3×3 allocation problem (where M=N=3) requires 9 neurons. This diagram shows more specifically, the impact each parameter and control variable has on each neuron. Note that the β values are constant across vehicle numbers, and the τ values are constant across task numbers.

To execute this allocation algorithm using the SNN hardware system, the proposed algorithm was implemented using three layers of spiking neurons connected through weight matrices. The first neuron layer simply provides the input spikes, where the constant spike rate for each neuron is determined by an input bias. The second neuron layer contains the accumulating neurons. Each input neuron is connected to a unique accumulating neuron through a weight holding a value proportional to each neuron's base accumulation rate. The neurons in this layer will each accumulate until one is first to fire. Once a neuron in the accumulation layer fires, the third and final layer of neurons is able to implement feedback control. The control neuron layer is used to implemented the variables $\tau_i$ and $B_j$ within the SNN hardware system. In this system, for an M by N allocation, and require M×N input neurons, M×N accumulating neurons, and M+N control neurons. The system requires an input and accumulation neuron for every vehicle-task combination. However, the system only requires one control neuron for each vehicle in addition to one control neuron for each task.

Figure 6A:
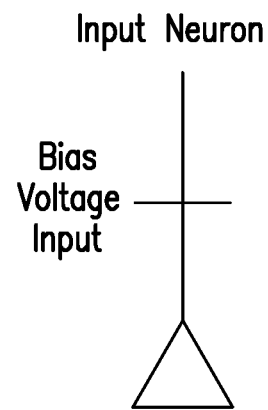
FIG. 6 is a diagram displaying basic neuron operation for (a) the input layer, (b) the accumulation layer, and (c) the control layer.
Figure 6B:
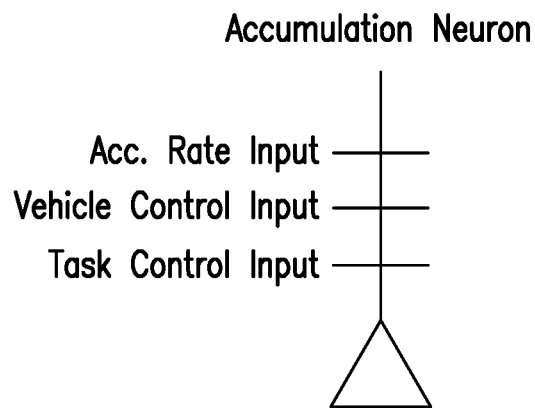
Figure 6C:
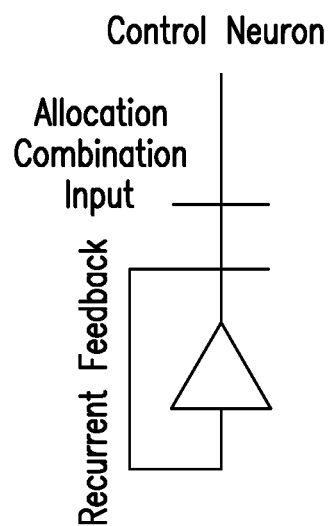

Diagrams for the neurons that exist in each of these three layers are displayed in FIG. 6. The input neurons in FIG. 6 are simply driven by a bias input and produce a constant spiking output. The accumulation neurons in FIG. 6 accumulate according to a base rate, but this rate can be slowed by the inhibitory Task Control Input or cancelled out by the inhibitory Vehicle Control Input. Finally, the control neurons as displayed in FIG. 6 respond to an occurrence of a spike in the accumulation layer, and the control neurons possess recurrent feedback. The threshold of the control neurons is set in such a way that they will fire as a result of a single spike input. Thus, due to the recurrent feedback, a control neuron will fire every cycle after it has been told to fire once by an accumulation neuron.

To implement the variable $\tau_i$, all accumulating neurons associated with vehicle i must be set to no longer accumulate once vehicle i reaches a target. This is done by connecting the control neuron associated with vehicle i to the Vehicle Control Input of all accumulation neurons associated with vehicle i. The weight of this connection is set to −255, the absolute minimum value possible. Thus, accumulation neurons associated with vehicle i will no longer fire because the excitatory accumulation rate will never exceed the inhibitory control connection.

Similarly, the variable $\beta_j$ is also implemented using neurons from the control layer. When an accumulation neuron fires that is associated with task j, all other accumulation neurons associated with task j must reduce their accumulation rate by one half. Thus, the output of the control neuron associated with task j is connected to the Task Control Input of all accumulation neurons associated with task j. The weight value for a task control connection is set to one fourth of the accumulation rate of a specific accumulation neuron in the inhibitory direction. This achieves the desired result of slowing the accumulation rate by one half because once activated, the control neurons fire at twice the rate of the input neurons. This design decision was made to make sure control is enacted as quickly as possible after an accumulation neuron fires. The faster the control neurons fire, the less likely it will be that incorrect neurons will fire due to delay between the neuron layers.

Figure 7:
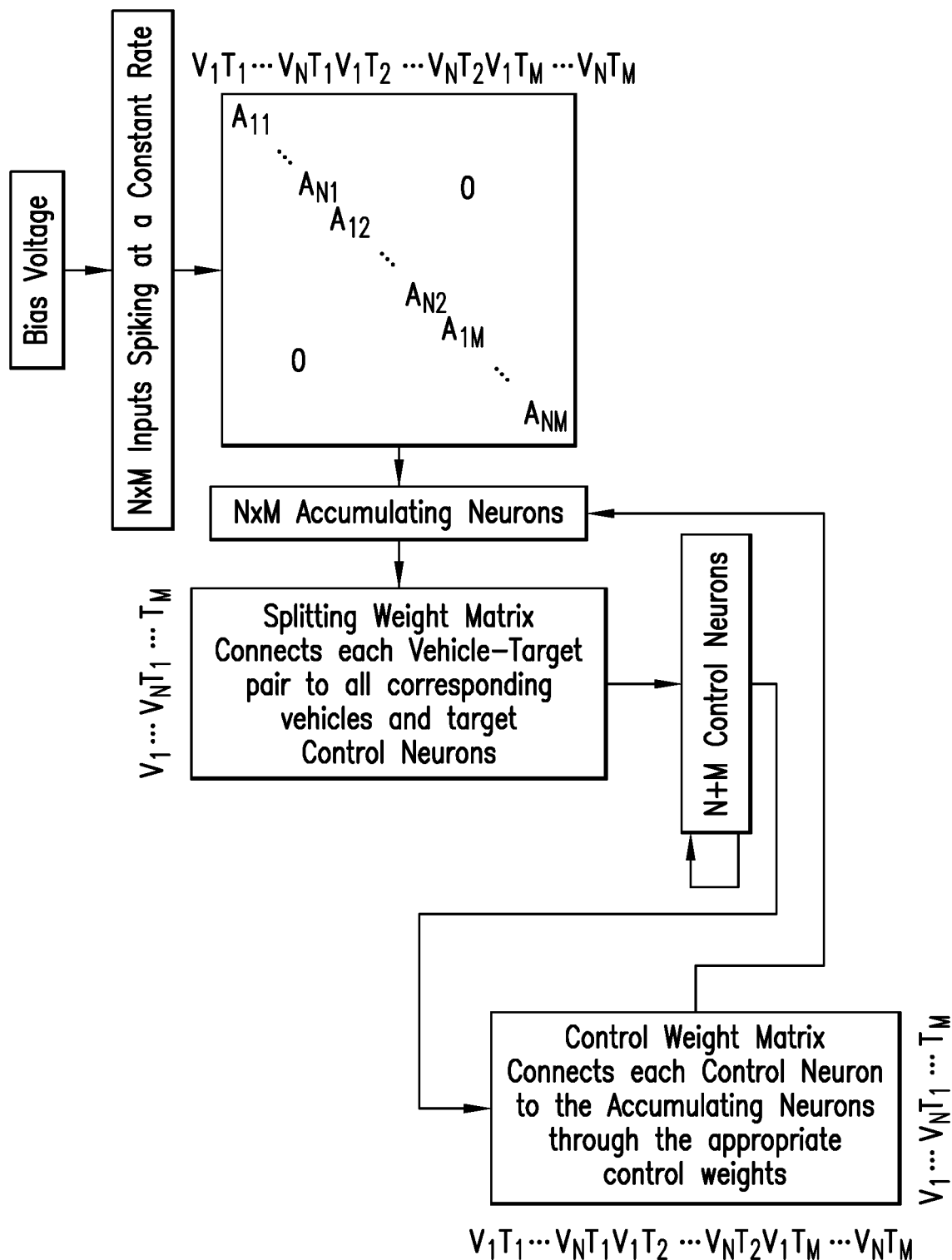
FIG. 7 is a block diagram displaying connection diagram, weights, and neurons required to implement the M×N allocation algorithm on the SNN hardware system.

The block diagram for the entire SNN hardware implementation of the spiking allocation algorithm is displayed in FIG. 7. The input bias voltage is applied to the layer of input neurons through a weight matrix that provides a one-to-one connection to the neurons in the accumulation layer. Whenever neuron $V_iT_j$ in the accumulation layer fires, an allocation designation is made so that Vehicle i is allocated to Task j. Also, this output is applied to the control neuron layer through a splitting weight matrix so that the control neurons corresponding to Vehicle i and Task j are activated. The control neurons then provide the correct signals to implement the $\tau_i$ and $\beta_j$ variables in the algorithm.

Resistive Memory Architecture for Constraint Satisfaction Problems

Figure 8:
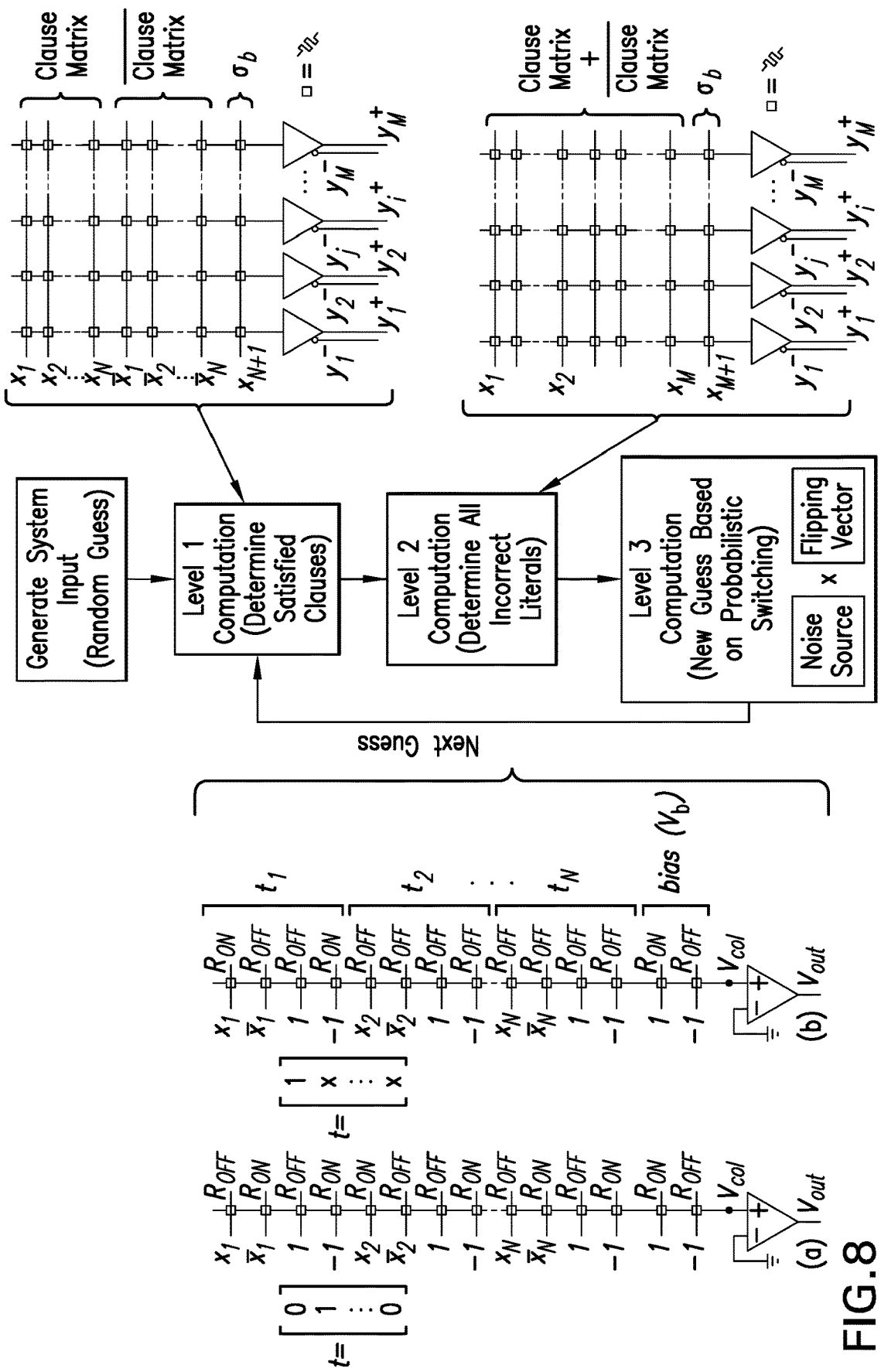
FIG. 8 is an example of how a memristor crossbar could be used to implement the computations of the NN SAT system.

FIG. 8 shows the memristor based circuits required to perform the operations required to carry out the previously described SAT algorithm. In each of these circuits, the amplifiers only need to produce a binary output which makes implementation much simpler. Furthermore, memristor values can be stored as binary values, which greatly simplifies the memristor programming process. This also relaxes the precision and flexibility requirements of the memristors used in the system.

It is to be appreciated that the Detailed Description section, and not the Abstract section, is intended to be used to interpret the claims. The Abstract section can set forth one or more, but not all exemplary embodiments, of the present disclosure, and thus, is not intended to limit the present disclosure and the appended claims in any way.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in art. The invention in its broader aspects is therefore not limited to the specific details, representative apparatus and method and illustrative examples shown and described. Accordingly, departures may be made from such details without departing from the scope of the general inventive concept.

What is claimed is:

1. A spiking neural network (SNN) system that implements a plurality of spiking neurons to solve a satisfiability (SAT) problem, comprising:

a plurality of spiking neurons with each spiking neuron associated with a corresponding clause value from a plurality of clause values associated with the SAT problem and configured to generate a voltage spike when at least one input voltage applied to each spiking neuron is increased above a spiking voltage threshold, wherein the at least one input voltage applied to each spiking neuron that is increased above the spiking voltage threshold is indicative that the corresponding clause value associated with the spiking neuron is satisfied; and a controller configured to:
determine a literal grid that includes a plurality of literal values associated with the SAT problem, wherein each literal value is a fixed binary value,
determine a clause grid that includes the plurality of clause values associated with the SAT problem, wherein each clause value includes a corresponding subset of the literal values and corresponds to a constraint from a plurality of constraints associated with the SAT problem and each constraint is to be satisfied to solve the SAT problem,
apply the clause grid that includes the plurality of clause values to the literal grid that includes the plurality of literal values,
generate the at least one input voltage that is applied to each spiking neuron based on each corresponding clause value associated with each spiking neuron that is applied to the plurality of literal values,
determine that each clause value is satisfied when the corresponding spiking neuron generates the voltage spike and that each clause value is unsatisfied when the corresponding spiking neuron fails to generate the voltage spike,
continuously feedback each clause value that is unsatisfied following each iteration applying the clause grid to an updated revised literal grid that includes the corresponding literal value of each incorrect literal value previously generated when the clause grid is applied to the literal grid, and
continuously apply the clause grid to each updated revised literal grid when at least one spiking neuron fails to generate the voltage spike indicating that at least one clause value is unsatisfied.

2. The SNN system of claim 1, wherein the at least one input voltage applied to each spiking neuron that is increased above the spiking voltage threshold is indicative that the corresponding clause value associated with the spiking neuron is unsatisfied.

3. The SNN system of claim 1, wherein the controller is further configured to:
determine a plurality of correct literal values and a plurality of incorrect literal values after the clause grid is applied to the literal grid, wherein each correct literal value is included in a corresponding clause value that is satisfied and each incorrect literal value is included in a corresponding clause value that is unsatisfied;
transition each incorrect literal value to a corresponding complemented literal value, wherein each corresponding complemented literal value is a complement of the incorrect literal value that is initially applied to the corresponding clause value that is unsatisfied.

4. The SNN system of claim 3, wherein the controller is further configured to:
apply the clause grid that includes the plurality of clause values to a revised literal grid that includes the corresponding complemented literal value of each incorrect literal value previously generated when the clause grid is applied to the literal grid;
generate the at least one input voltage that is applied to each spiking neuron based on each corresponding clause value associated with each spiking neuron that is applied to each revised literal value included in the revised literal grid; and
determine that each clause value is satisfied when the corresponding spiking neuron generates the voltage spike and each clause value is unsatisfied when the corresponding spiking neuron fails to generate the voltage spike.

5. The SNN system of claim 4, wherein the controller is further configured to:
determine when each spiking neuron generates the voltage spike indicating each clause value is satisfied; and
generate a SAT answer value that includes each current value of each corresponding literal value after each spiking neuron generates the voltage spike indicating each clause value is satisfied, wherein the SAT answer value is an answer to the SAT problem.

6. The SNN system of claim 5, further comprising:
a noise generator that is configured to randomly select a first portion of incorrect literal values from the plurality of incorrect literal values to transition to the corresponding complemented literal value and a second portion of incorrect literal values to refrain from transitioning to the corresponding literal value to prevent the SNN system from locking up when transitioning each incorrect literal value to the corresponding complemented literal value.

7. The system of claim 1, wherein the controller is further configured to:
map each clause value that corresponds to each clause associated with a corresponding constraint of the SAT problem into each column of the clause grid;
weight each clause value with a binary weight to associate an impact of each clause as corresponding to each constraint of the SAT problem, wherein each constraint that includes an increased impact on the SAT problem is associated with each corresponding clause with an increased binary weight to correspond to the increased impact of each clause relative to each other clause.

8. The system of claim 1, wherein the controller is further configured to:
generate a feedback loop that provides an updated vector matrix with a plurality of updated literal values to thereby apply the updated vector matrix to the clause grid for each iteration to determine each clause that is satisfied and each clause that is unsatisfied;
apply during the feedback loop the clause grid to the plurality of clause values to generate the revised literal grid that includes each corresponding complemented literal value of each incorrect literal value previously generated when the clause grid is previously applied to the literal grid; and
generate during the feedback loop at least one input voltage to each spiking neuron based on each corresponding clause value associated with each spiking neuron that is applied to each revised literal value included in the revised literal grid.

9. The system of claim 8, wherein the controller is further configured to:
continuously feedback each value that is unsatisfied following each iteration of applying the clause grid to an updated revised literal grid that includes the corresponding literal value of each incorrect literal value previously generated when the clause grid is applied to the literal grid;
continuously apply the clause grid to each updated revised literal grid when at least one spiking neuron fails to generate the voltage spike indicating that at least one clause value is unsatisfied; and
determine when each spiking neuron generates the voltage spike indicating each clause is satisfied to generate a SAT answer value that includes each current value of each corresponding literal value after each spiking neuron generates the voltage spike indicating each clause value is satisfied, wherein the SAT answer value is an answer to the SAT problem.

10. A method for implementing a plurality of spiking neurons to solve a Satisfiability (SAT) problem with each spiking neuron associated with a corresponding clause value from a plurality of clause values associated with the SAT problem, comprising:
generating by each spiking neuron included in a plurality of spiking neurons a voltage spike when at least one input voltage applied to each spiking neuron is increased above a spiking voltage threshold, wherein the at least one input voltage applied to each spiking neuron that is increased above the spiking voltage threshold is indicative that the corresponding clause value associated with the spiking neuron is satisfied;
determining by a controller a literal grid that includes a plurality of literal values associated with the SAT problem, wherein each literal value is a fixed binary value;
determining a clause grid that includes the plurality of clause values associated with the SAT problem, wherein each clause value includes a corresponding subset of the literal values and corresponds to a constraint from a plurality of constraints associated with the SAT problem and each constraint is to be satisfied to solve the SAT problem;
applying the clause grid that includes the plurality of clause values to the literal grid that includes the plurality of literal values;
generating the at least one input voltage that is applied to each spiking neuron based on each corresponding clause value associated with each spiking neuron that is applied to the plurality of literal values;
determining that each clause value is satisfied when the corresponding spiking neuron generates the voltage spike and that each clause value is unsatisfied when the corresponding spiking neuron fails to generate the voltage spike;
continuously feedbacking each clause value that is unsatisfied following each iteration applying the clause grid to an updated revised literal grid that includes the corresponding literal value of each incorrect literal value previously generated when the clause grid is applied to the literal grid; and
continuously applying the clause grid to each updated revised literal grid when at least one spiking neuron fails to generate the voltage spike indicating that at least one clause value is unsatisfied.

11. The method of claim 10, wherein the at least one input voltage applied to each spiking neuron that is increased above the spiking voltage threshold is indicative that the corresponding clause value associated with the spiking neuron is unsatisfied.

12. The method of claim 10, further comprising:
determining a plurality of correct literal values and a plurality of incorrect literal values after the clause grid is applied to the literal grid, wherein each correct literal value is included in a corresponding clause value that is satisfied and each incorrect literal value is included in a corresponding clause value that is unsatisfied; and
transitioning each incorrect literal value to a corresponding complemented literal value, wherein each corresponding complemented literal value is a compliment of the incorrect literal value that is initially applied to the corresponding clause value that is unsatisfied.

13. The method of claim 12, further comprising:
applying the clause grid that includes the plurality of clause values to a revised literal grid that includes the corresponding complemented literal value of each incorrect literal previously generated when the clause grid is applied to the literal grid;
generating the at least one input voltage that is applied to each spiking neuron based on each corresponding clause value associated with each spiking neuron that is applied to each revised literal value included in the revised literal grid; and
determining that each clause value is satisfied when the corresponding spiking neuron generates the voltage spike and each clause value is unsatisfied when the corresponding spiking neuron fails to generate the voltage spike.

14. The method of claim 13, further comprising:
determining when each spiking neuron generates the voltage spike indicating each clause value is satisfied; and
generating a SAT answer value when that includes each current value of each corresponding literal value after each spiking neuron generates the voltage spike indicating each clause value is satisfied, wherein the SAT answer value is an answer to the SAT problem.

15. The method of claim 14, further comprising:
randomly selecting by a noise generator a first portion of incorrect literal values from the plurality of incorrect literal values to transition to the corresponding complemented literal value and a second portion of incorrect literal values to refrain from transitioning to the corresponding literal value to prevent the SNN system from locking up when transitioning each incorrect literal value to the corresponding complemented literal value.

16. The method of claim 10, further comprising:
mapping each clause value that corresponds to each clause associated with a corresponding constraint of the SAT problem to each column of the clause grid;
weighting each binary clause value with a binary weight to associate an impact of each clause as corresponding to each constraint of the SAT problem, wherein each constraint that includes an increased impact on the SAT problem is associated with each corresponding clause within an increased binary weight to correspond to the increased impact of each clause relative to each other clause.

17. The method of claim 10, further comprising:
generating a feedback loop that provides an updated vector matrix with a plurality of updated literal values to thereby apply the updated vector matrix to the clause grid for each iteration to determine each clause that is satisfied and each clause that is unsatisfied;
applying during the feedback loop the clause grid to the plurality of clause values to generate the revised literal grid that includes each corresponding complemented literal value of each incorrect literal value previously generated when the clause grid is previously applied to the literal grid; and
generate during the feedback loop at least one input voltage to each spiking neuron based on each corresponding clause value associated with each spiking neuron that is applied to each revised literal value included in the revised literal grid.

18. The method of claim 17, further comprising:
continuously feedbacking each value that is unsatisfied following each iteration of applying the clause grid to an updated revised literal grid that includes the corresponding literal value of each incorrect literal value previously generated when the clause grid is applied to the literal grid;
continuously applying the clause grid to each updated revised literal grid when at least one spiking neuron fails to generate the voltage spike indicating that at least one clause value is unsatisfied; and
determining when each spiking neuron generates the voltage spike indicating each clause is satisfied to generate a SAT answer value that includes each current value of each corresponding literal value after each spiking neuron generates the voltage spike indicating each clause value is satisfied, wherein the SAT answer value is an answer to the SAT problem.

* * * * *